United States Patent
Yasuo

(10) Patent No.: US 7,469,189 B2
(45) Date of Patent: Dec. 23, 2008

(54) ELECTRONIC DEVICE, FAILURE PREDICTION METHOD, AND COMPUTER PRODUCT

(75) Inventor: Akihiro Yasuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 566 days.

(21) Appl. No.: 10/875,917

(22) Filed: Jun. 23, 2004

(65) Prior Publication Data
US 2005/0193284 A1 Sep. 1, 2005

(30) Foreign Application Priority Data
Feb. 6, 2004 (JP) ............................ 2004-030570

(51) Int. Cl.
G06F 11/00 (2006.01)
(52) U.S. Cl. ........................ 702/58; 702/185; 714/48
(58) Field of Classification Search .............. 702/58, 702/185, 182, 81; 318/434; 360/31, 46, 360/53; 361/7, 23; 714/721, 20, 26, 37, 714/39, 704, 48; 700/117, 110; 719/321
See application file for complete search history.

(56) References Cited

U.S. PATENT DOCUMENTS

| 5,557,183 | A | * | 9/1996 | Bates et al. ................. 318/434 |
| 5,923,876 | A | * | 7/1999 | Teague ....................... 719/321 |
| 6,078,455 | A | * | 6/2000 | Enarson et al. ............... 360/68 |
| 6,108,586 | A | * | 8/2000 | Suzuki et al. ............... 700/117 |
| 6,249,890 | B1 | * | 6/2001 | Ukani et al. ................ 714/721 |
| 2004/0085670 | A1 | * | 5/2004 | Li et al. ........................ 360/75 |

FOREIGN PATENT DOCUMENTS

| JP | 2-087079 | 3/1990 |
| JP | 7-128384 | 5/1995 |

\* cited by examiner

Primary Examiner—Michael P. Nghiem
Assistant Examiner—Hien X Vo
(74) Attorney, Agent, or Firm—Greer, Burns & Crain, Ltd.

(57) ABSTRACT

An electronic device that includes a part prone to aged deterioration includes an environmental load applying unit that applies a higher environmental load on the part than an environmental load in a normal operation, an error detecting unit that detects an error in the part with the higher environmental load applied, and a failure predicting unit that predicts a failure of the part based on the error detected.

12 Claims, 13 Drawing Sheets

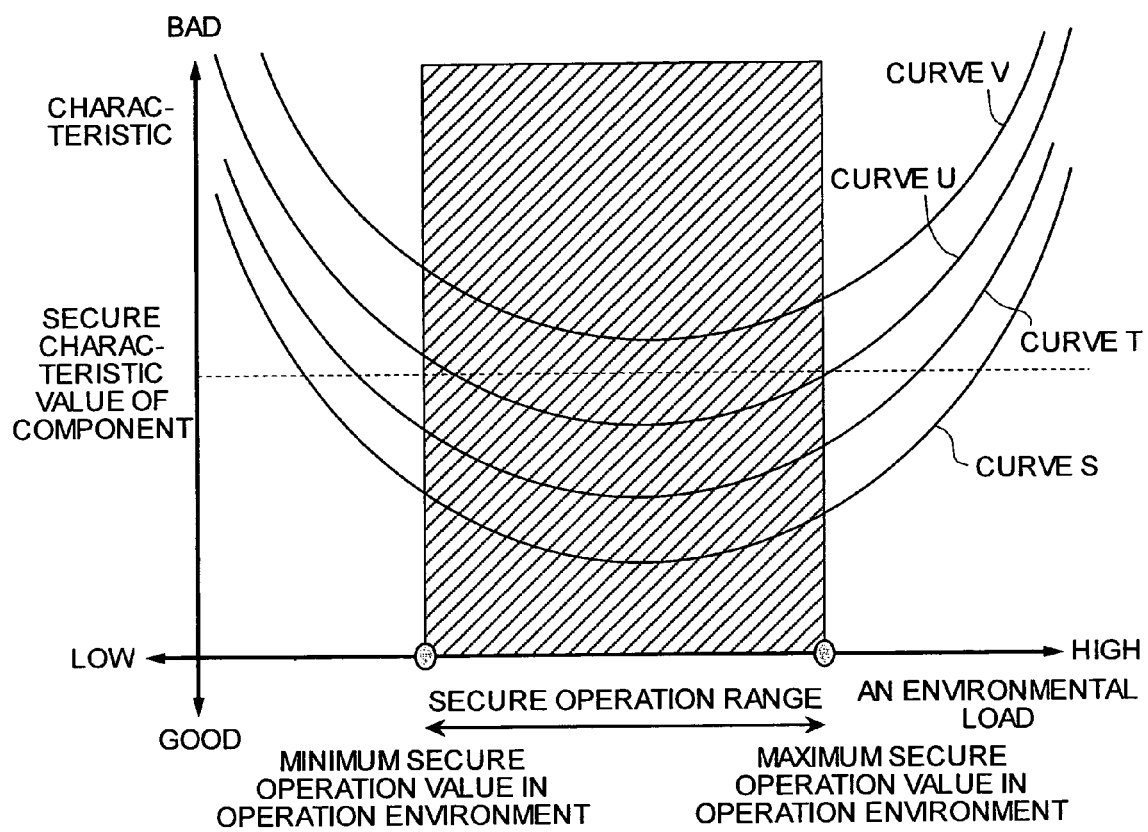

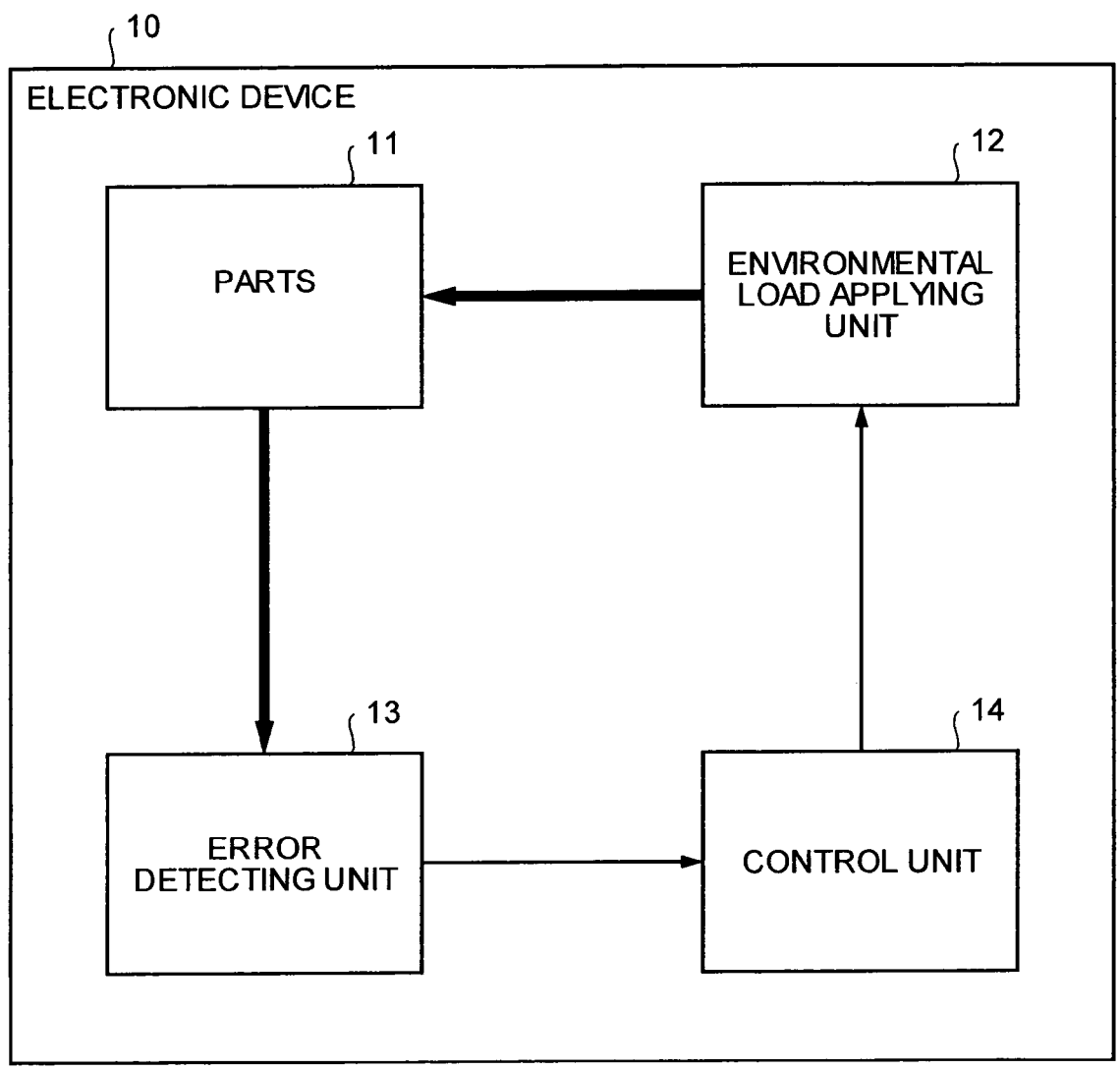

| MINIMUM SECURE OPERATION VALUE (°C) | MAXIMUM SECURE OPERATION VALUE (°C) |
|---|---|
| 5 | 55 |

ELECTRONIC DEVICE, FAILURE PREDICTION METHOD, AND COMPUTER PRODUCT

BACKGROUND OF THE INVENTION

1) Field of the Invention

The present invention relates to a technology for predicting a failure of a part that is prone to aged deterioration in an electronic device by directly detecting a signal of impending failure of the part.

2) Description of the Related Art

The possibility of a system failure due to breakdown of constituent parts has increased in recent electronic devices, such as an information apparatus or a communication apparatus, because of large scale and high rate of integration of the system. For instance, a blade server that realizes a high-density mounting includes more number of parts, such as several hundred scales of CPUs, than a conventional server, which may cause a higher rate of part failure. Although a method such as a dual operation of a system is employed to avoid the system failure, there still is a system failure occurred due to a complex failure interacted with a latent failure in the system.

Hence, it is extremely important to predict a failure of a part to avoid the system failure, and a technology to predict a part failure using a statistical method has been developed. The failure prediction based on the statistical method compares a result of measurement of operation status of an electronic device using a sensor with an operation model of constituent parts to predict a failure.

The operation model is created based on performance data obtained from each of the parts, and is periodically updated. By compensating a minute disturbance appearing as a noise between the operation model and a result of actual measurement, it is possible to determine whether the result is within an acceptable range or a sign of a coming failure. For instance, in the case of a hard disk device, it is possible to predict a failure by a comparing of a measured response time with a calculated response time from the operation model.

Another technique, as an extension of the statistical method, employs a redundant hardware structure to an electronic circuit or a part of interest, and applies a greater load than that for a normal operation of the circuit to the redundant structure. At the point at which the redundant circuit breaks down it predicts that a breakdown of the circuit may be imminent (for example, see Japanese Patent Laid-Open Publication No. H2-87079 and Japanese Patent Laid-Open Publication No. H7-128384).

However, the accuracy of the statistical method is dependent on a quality of the operation model, and it is difficult to make a model of all operations of a complex semiconductor device with a large-scale. Besides, the accuracy of the statistical method is also dependent on setting a threshold value when determining a difference between an actual operation and the operation model, and it is also extremely difficult to set a proper threshold value.

The method using the redundant circuit is not better than a statistical method, having a problem of a considerable error caused by a variation in the parts, subtle differences in the test environment, etc. Furthermore, regarding running of a system, it is not easy to replace a part of questionable life expectancy in a normally operation status of a circuit of interest.

SUMMARY OF THE INVENTION

It is an object of the present invention to solve at least the problems in the conventional technology.

The electronic device according to one aspect of the present invention includes an environmental load applying unit that applies a higher environmental load on the part than an environmental load in a normal operation, an error detecting unit that detects an error in the part with the higher environmental load applied, and a failure predicting unit that predicts a failure of the part based on the error detected.

The failure prediction method according to another aspect of the present invention includes applying a higher environmental load on the part than an environmental load in a normal operation, detecting an error in the part with the higher environmental load applied and predicting the failure of the part based on the error detected.

The computer program according to still another aspect of the present invention realizes the method according to the above aspect on a computer.

The computer readable recording medium according to still another aspect of the present invention stores the computer program according to the above aspect.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 1A is a graph of part characteristic curves in response to an environmental load;

FIG. 1B is a block diagram of an electronic device according to an embodiment of the present invention;

DETAILED DESCRIPTION

Figure 2:
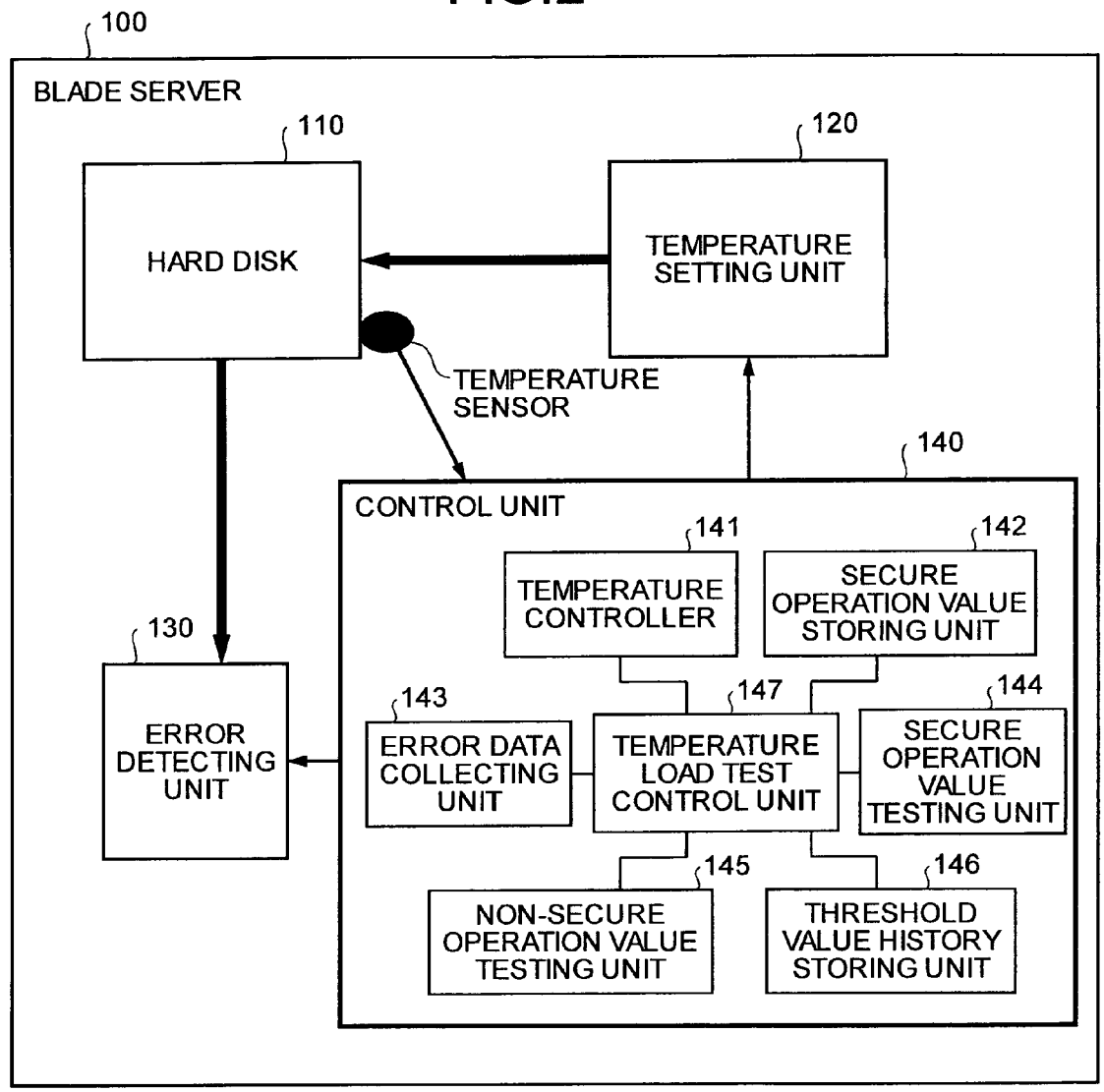
FIG. 2 is a block diagram of a blade server according to a first embodiment of the present invention.

Exemplary embodiments of an electronic device, a failure prediction method, and a computer product according to the present invention are explained in detail with reference to the accompanying drawings. In the present embodiments, the present invention is applied to a blade server.

A concept of failure prediction according to an embodiment of the present invention is explained first with reference to FIG. 1A and FIG. 1B. In the failure prediction method according to the present invention, failure is predicted by using the feature of the tendency of an electronic part to fail when a high stress is applied.

FIG. 1A is a graph of part characteristic curves in response to an environmental load. An electronic part tends to malfunction when a high load is applied in environmental conditions such as temperature, humidity, voltage, etc.

For this reason, the environmental conditions for the electronic parts mounted on an apparatus are usually provided so that the conditions for a secure operation are within stipulated values. (For instance, if the environmental temperature of the part is anticipated to exceed the stipulated value, a fan, and the like is provided for cooling.)

To test the parts that have a tendency to malfunction upon high stress, these parts are subjected to a burn-in test as a part of product release test. In the burn-in test, temperatures exceeding that for secure operation are applied and all the parts that develop error are assessed to be defective.

Failure is assessed to have occurred in the electronic part due to detection deterioration if there is a gradual deterioration in the characteristics of the part and when eventually the characteristics of the part exceed a threshold value for malfunctioning under the operating environment.

In other words, the aged deterioration of parts is progressing (from curve S to curve T) even though no failure occurs under normal operating environment conditions. The normal operating conditions are not affected even if the deterioration progresses further, almost to the point of breakdown of the part. However, the normal operating conditions are adversely affected if the deterioration progresses further, leading to a cascading breakdown, first of the entire apparatus, and then of the entire system (curve U and curve V).

Therefore, if the aged deterioration of the part can be detected, then the failure prediction can be done for the part. In the failure prediction method according to the present invention, a high load of environmental condition is applied on the part and malfunctioning under high load is detected. In this way, the part that is normally functioning under normal conditions in spite of aged deterioration is detected and the failure of the apparatus and system due to a malfunctioning part can be avoided.

FIG. 1B is a block diagram of an electronic device according to an embodiment of the present invention. An electronic device 10 includes parts 11, an environment load applying unit 12, an error detecting unit 13, and a control unit 14.

The parts 11 realize the function of the electronic device 10, and for which failure prediction is to be carried out. The environment load applying unit 12 is a functional part that applies environment load in the form of temperature, humidity, voltage, etc. on the parts 11.

The error detecting unit 13 is a functional part that detects error in the device part to which load is applied. Error detection can be carried out by providing a detecting unit externally or by monitoring error signals such as parity/ECC error, etc. output by the parts 11.

The control unit 14 controls the environment load applying unit 12 to apply environmental load on the parts 11, and based on the error detected by the error detecting unit 13, carries out failure prediction for the parts 11. The control unit 14 may issue an instruction for environmental load application test under normal operating conditions. Alternatively, when a problem is encountered in the apparatus, the control unit 14 may switch to a test mode and issue the instruction for environmental load application test.

Thus, in the electronic device 10 according to the present embodiment, the control unit 14 controls the environmental load applying unit 12 to apply a greater load than under normal operating conditions. The control unit 14 then carries out failure prediction for the parts 11 based on the error detected by the error detecting unit 13. Consequently, it is possible to directly pick up the extent of deterioration of the part which is approaching breakdown due to detection deterioration but still functions normally under normal conditions.

FIG. 2 is a block diagram of a blade server according to a first embodiment of the present invention. A blade server 100 includes a hard disk 110, a temperature setting unit 120, an error detecting unit 130, and a control unit 140.

Figure 3:
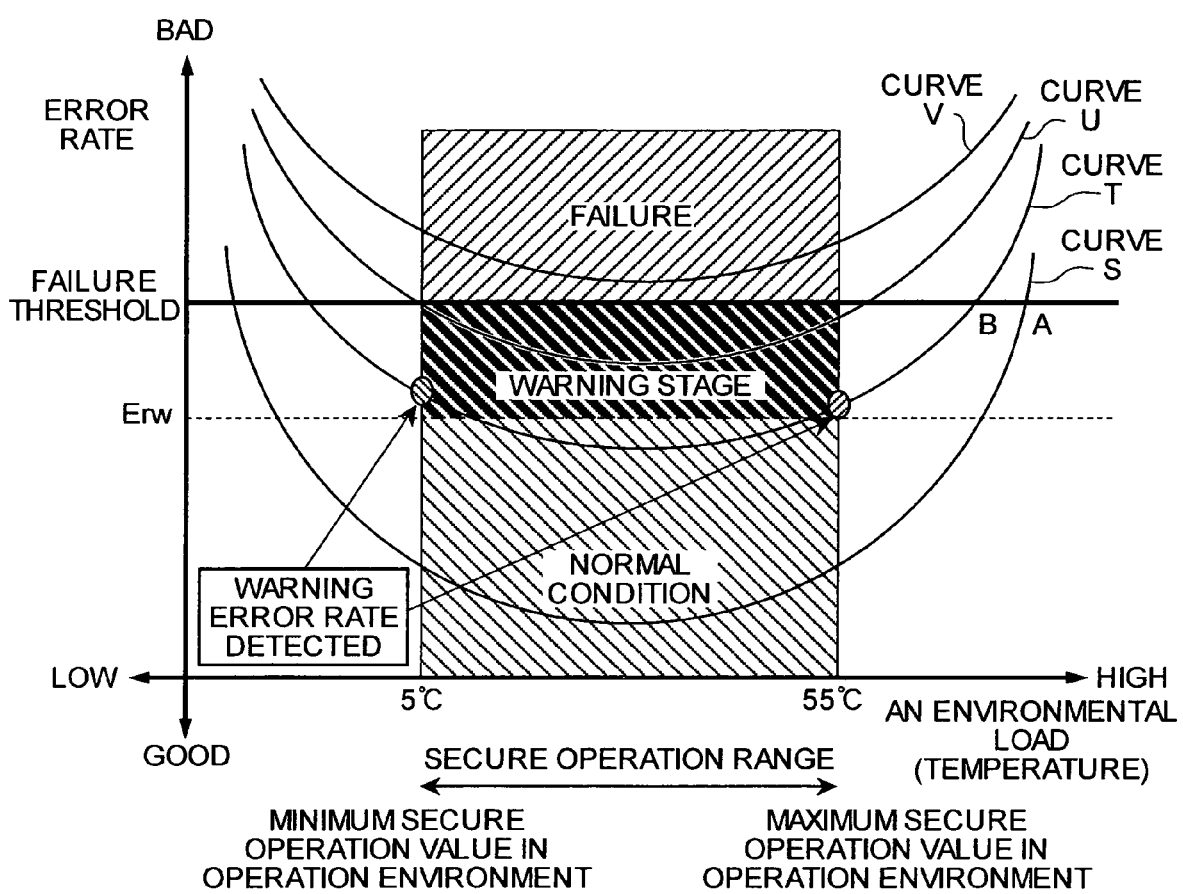
FIG. 3 is a graph of an error rate of a hard disk in response to a temperature load.

The hard disk 110 is the part to which a temperature load is applied by the temperature setting unit 120 and for which failure prediction is to be carried out. FIG. 3 is a graph of an error rate of a hard disk 110 in response to a temperature load.

Generally, a maximum temperature and a minimum temperature for absolute rating, and a maximum temperature and a minimum temperature for secure operation are stipulated as operating conditions for all electronic parts such as the hard disk 110. The absolute rating is a value which when exceeded results in the possibility of a breakdown of the part. The secure operation temperature value is a temperature value which when exceeded does not guarantee a normal operation.

In other words, a normal part may not function normally in an environment outside the secure operation temperature range. However, within the secure operation temperature range, normal functioning of the part is guaranteed. However, a part that is approaching breakdown due to detection deterioration functions normally in a normal operating environment, but may malfunction in an environment which is close to the secure operation temperature values within the secure operation temperature range.

Thus, by periodically applying a temperature load of a secure operation temperature or of a temperature close to the secure operation temperature range on the hard disk 110, it can be determined that the hard disk 110 is approaching a breakdown due to aged deterioration.

Under normal conditions, the error rate of the hard disk 110 is within the secure operation temperature range and is below (curve S) a warning error rate (Erw). If the detection deterioration progresses and the characteristics of the hard disk 110 deteriorate, the characteristic curve is represented by first curve T and then curve U, and a SMART (Self-Monitoring, Analysis and Reporting Technology) function of the hard disk 110 assesses this as a warning situation.

The SMART function is a self-diagnostic function of the hard disk 110, which logs errors that occur. When multiple errors occur, the SMART function decides that the hard disk 110 needs to be replaced.

However, since the time span between the assessment by the SMART function as a warning situation and a complete breakdown of the part (represented by curve V) is short, there is a high possibility of a breakdown of the entire system before the disk is replaced.

Therefore, in the blade server 100 according to the present embodiment, the error rate is measured under the operating condition of the minimum secure operation temperature of 5° C. or the maximum secure operation temperature of 55° C. Thus, failure prediction can be done at a step earlier (represented by curve T) than the failure prediction step of the SMART function.

The temperature setting unit 120 is a functional part that applies the temperature load on the hard disk 110, for instance, a temperature correcting circuit such as a Peltier element. The error detecting unit 130 is a functional part that detects malfunctioning in the hard disk 110 that results from the application of the temperature load.

The control unit 140 is a functional part that controls the temperature setting unit 120 to apply the temperature load on the hard disk 110 based on the temperature measured by a temperature sensor disposed near the hard disk 110, and carries out failure prediction by calculating the error rate of the hard disk 110 based on the error detected by the error detecting unit 130.

The control unit 140 includes a temperature controller 141, a secure operation value storing unit 142, an error data collecting unit 143, a secure operation value testing unit 144, a non-secure operation value testing unit 145, a threshold value history storing unit 146, and a temperature load test controller 147.

The temperature controller 141 controls the temperature setting unit 120 to set the temperature of the hard disk 110 to the temperature setting specified by the secure operation value testing unit 144 or the non-secure operation value testing unit 145.

Figures 4, 5:
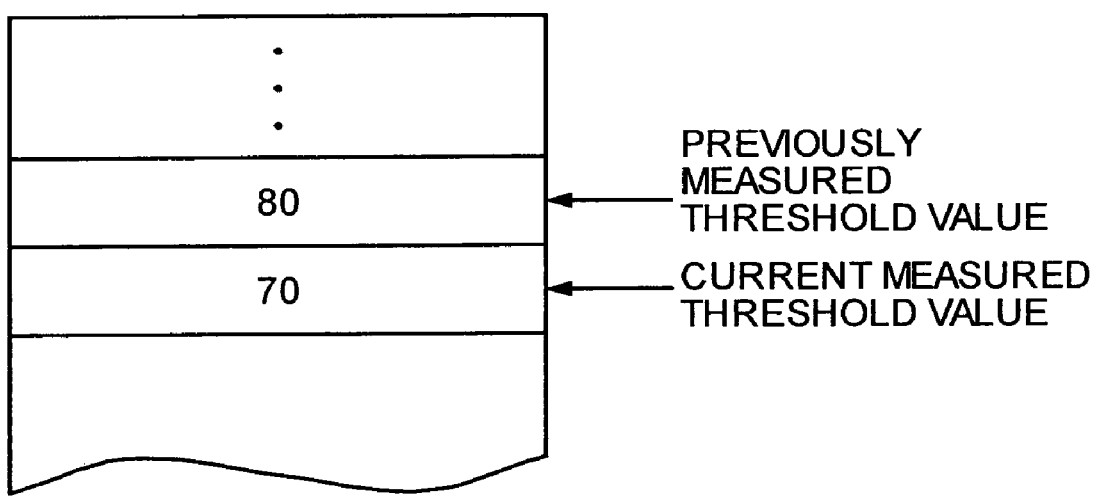
FIG. 4 is a table of an example of data stored in a secure operation value storing unit.
FIG. 5 is a table of an example of data stored in a threshold value history storing unit.

The secure operation value storing unit 142 stores secure operation temperature values of the hard disk 110. FIG. 4 is a table of an example of data stored in the secure operation value storing unit 142 in which the minimum secure operation temperature is 5° C. and the maximum secure operation temperature is 55° C.

The error data collecting unit 143 calculates the error rate of the hard disk 110 based on the error detected by the error detecting unit 130. The error rate calculated by the error data collecting unit 143 is used by the secure operation value testing unit 144 and the non-secure operation value testing unit 145 in the failure prediction for the hard disk 110.

The secure operation value testing unit 144 carries out a secure temperature value application test to determine the error rate when a temperature load of the secure operation value is applied on the hard disk 110. If the determined error rate exceeds the warning error rate, the secure operation value testing unit 144 notifies the user that there is high possibility of the hard disk 110 breakdown. To be more specific, the secure operation value testing unit 144 carries out the secure operation value test by applying the maximum secure operation temperature of 55° C. on the hard disk 110.

The secure operation value testing unit 144 is able to carry out precise failure prediction for the hard disk 110 by determining the error rate by applying the maximum secure operation temperature of 55° C. on the hard disk 110, and notifying the user of a high possibility of the hard disk 110 breakdown if the determined error rate exceeds the warning error rate.

In the description given above, the secure operation value testing unit 144 determines the error rate by applying the maximum secure operation temperature of 55° C. on the hard disk 110. However, the secure operation value testing unit 144 can also determine the error rate by applying the minimum secure operation temperature of 5° C. on the hard disk 110. Further, apart from the maximum and minimum secure operation temperatures, a temperature that is close to the secure operation value within the secure operation temperature range can also be applied.

Further, error rate can be determined by applying both the maximum secure operation temperature of 55° C. and the minimum secure operation temperature of 5° C., and if either of the determined error rates exceeds the warning error rate, the user is notified of the high possibility of the hard disk 110 breakdown.

The non-secure operation value testing unit 145 carries out a non-secure temperature value application test that determines, when a temperature load exceeding the secure operation temperature values is applied on hard disk 110, a threshold temperature at which the error rate turns into a failure threshold.

The non-secure operation value testing unit 145 carries out the failure prediction for the hard disk 110 based on a relation between a previously measured threshold temperature, a current measured threshold temperature and the maximum secure operation temperature of 55° C. The non-secure operation value testing unit 145 determines the previously measured threshold temperature from a previous non-secure temperature value application test, and the current measured threshold temperature from a current non-secure temperature value application test.

The non-secure operation value testing unit 145 compares an absolute value obtained from the difference between the previously measured threshold temperature and the current measured threshold temperature with an absolute value obtained from the difference between the current measured threshold temperature and the maximum secure operation temperature of 55° C. If the absolute value obtained from the difference between the previously measured threshold temperature and the current measured threshold temperature is greater, the non-secure operation value testing unit 145 assesses that the hard disk 110 is likely to malfunction during the next non-secure temperature value application test and notifies this fact to the user.

The non-secure operation value testing unit 145 is able to carry out precise failure prediction for the hard disk 110 by determining, when the maximum secure operation temperature of 55° C. on the hard disk 110, the threshold temperature at which the error rate turns into a failure threshold, and carrying out failure prediction based on the relation between the previous measured threshold temperature and the maximum secure operation temperature.

Generally, a part does not immediately malfunction when a load exceeding a secure operation value is applied. Therefore, by first determining a threshold value exceeding the secure operation value in which the part works normally, and measuring this threshold, which varies with aged deterioration of the part, malfunctioning can be predicted within a time range in which operation recovery is possible.

In the description given above, the threshold temperature is determined by applying a temperature load exceeding the maximum secure operation temperature of 55° C. on the hard disk 110. However, the threshold temperature can also be determined by applying a temperature load exceeding the minimum secure operation temperature of 5° C. on the hard disk 110. Further, it is also possible to apply temperature loads exceeding both the maximum secure operation temperature of 55° C. and the minimum secure operation temperature of 5° C. on the hard disk 110, and failure prediction can be carried out by determining the threshold temperatures in both the cases. If malfunctioning of the hard disk 110 during the next non-secure temperature value application test is predicted based on either of the threshold temperatures, the user is notified of the fact.

The threshold value history storing unit 146 stores a history of the threshold temperature values determined by the non-secure operation value testing unit 145. For instance, as shown in FIG. 3, the temperatures A, B, etc., which are points at which the characteristic curves cut the line representing the failure threshold, are stored as the threshold temperatures in the threshold value history storing unit 146. The threshold temperatures stored in the threshold value history storing unit 146 are used by the non-secure operation value testing unit 145 for carrying out failure prediction.

FIG. 5 is a table of an example of data stored in the threshold value history storing unit 146. The threshold temperatures determined by the non-secure temperature value application test are stored sequentially in the threshold value history storing unit 146. For instance, the threshold value of the previous non-secure temperature value application test is 80°

C., and the threshold temperature determined from the current non-secure temperature value application test is 70° C.

The temperature load test controller 147 applies the temperature load on the hard disk 110 and controls all the temperature load tests. To be more specific, the temperature load test controller 147 carries out temperature load tests and failure prediction by transferring controls between the functional parts and transferring data between the functional parts and the storage unit.

Figure 6:
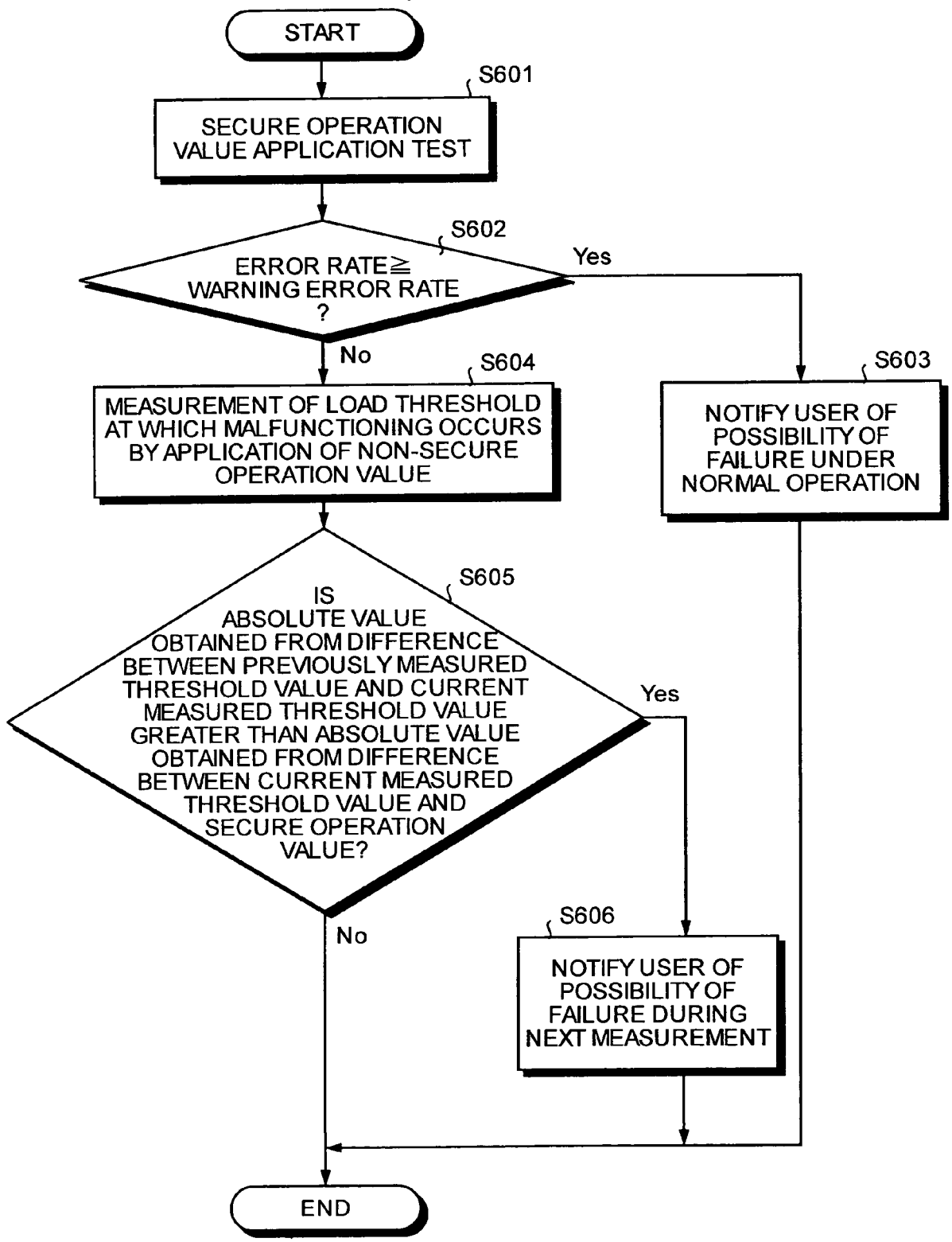
FIG. 6 is a flowchart a process procedure of failure prediction in the blade server according to the first embodiment.

A process sequence of failure prediction in the blade server 100 according to the first embodiment of the present invention is explained next. FIG. 6 is a flowchart a process procedure of failure prediction in the blade server 100 according to the first embodiment. The failure prediction is carried out at fixed intervals.

The secure operation value testing unit 144 first sets the temperature of the hard disk 110 to a secure operation temperature of 55° C. and carries out the secure operation test (Step S601).

The secure operation value testing unit 144 then assesses whether the error rate of the hard disk 110 is greater than the warning error rate (Step S602). If the error rate is greater than the warning error rate, the secure operation value testing unit 144 notifies the user the possibility of malfunctioning of the hard disk 110 under normal operating conditions (Step S603).

On the other hand, if the error rate is not greater than the warning error rate, the non-secure operation value testing unit 145 determines, by applying a non-secure operation temperature, the load threshold, that is, the threshold temperature, at which the hard disk 110 malfunctions (Step S604).

The non-secure operation value testing unit 145 then compares the absolute value obtained from the difference between the previously measured threshold temperature and the current measured threshold temperature with the absolute value obtained from the difference between the current measured threshold temperature and the secure operation temperature (Step S605). If the absolute value obtained from the difference between the previously measured threshold temperature and the current measured threshold temperature is greater, the non-secure operation value testing unit 145 assesses that the hard disk 110 is likely to malfunction during the next non-secure temperature value application test and notifies this fact to the user (Step S606).

If the absolute value obtained from the difference between the previously measured threshold temperature and the current measured threshold temperature is smaller, the non-secure operation value testing unit 145 assesses that the hard disk 110 will function normally in the next non-secure temperature value application test. The process ends here.

Thus, the secure operation value testing unit 144 carries out the secure operation temperature value application test and the non-secure operation value testing unit 145 carries out the non-secure operation temperature value application test, thereby realizing a precise failure prediction for the hard disk 110.

Thus, in the first embodiment of the present invention, precise failure prediction is achieved as it is based on application of a greater temperature load than that required for a normal operation on the hard disk 110 by the temperature setting unit 120 controlled by the control unit 140, and detection of malfunctioning of the hard disk 110 by the error detecting unit 130.

Consequently, a failure of the entire blade server 100 system caused by a malfunctioning of the hard disk 110 can be avoided. Moreover, the cost incurred for replacement as well as maintenance time can be cut down since the life of the hard disk 110 can be assessed.

Both the secure operation temperature value application test and the non-secure operation temperature value application test are carried out in the first embodiment of the present invention. However, either one of these tests can be carried out. In the secure operation temperature value application test, a value close to the secure operation temperature values and within the secure operation temperature range can be applied.

In the first embodiment explained above, the temperature setting unit 120 of the blade server 100 carries out the temperature load test by applying a temperature load on the hard disk 110. However, in electronic devices in general, the electronic parts themselves generate heat. This generated heat of the electronic part may also be applied as a temperature load.

To be more specific, a temperature load can be applied on the electronic parts by controlling the fan or a heat pump provided for cooling the electronic parts. For instance, a temperature load can be applied by slowing down or stopping the fan. In the electronic device explained in a second embodiment of the present invention, the temperature load tests are carried out by applying temperature load by means of controlling the cooling of the electronic part.

Figure 7:
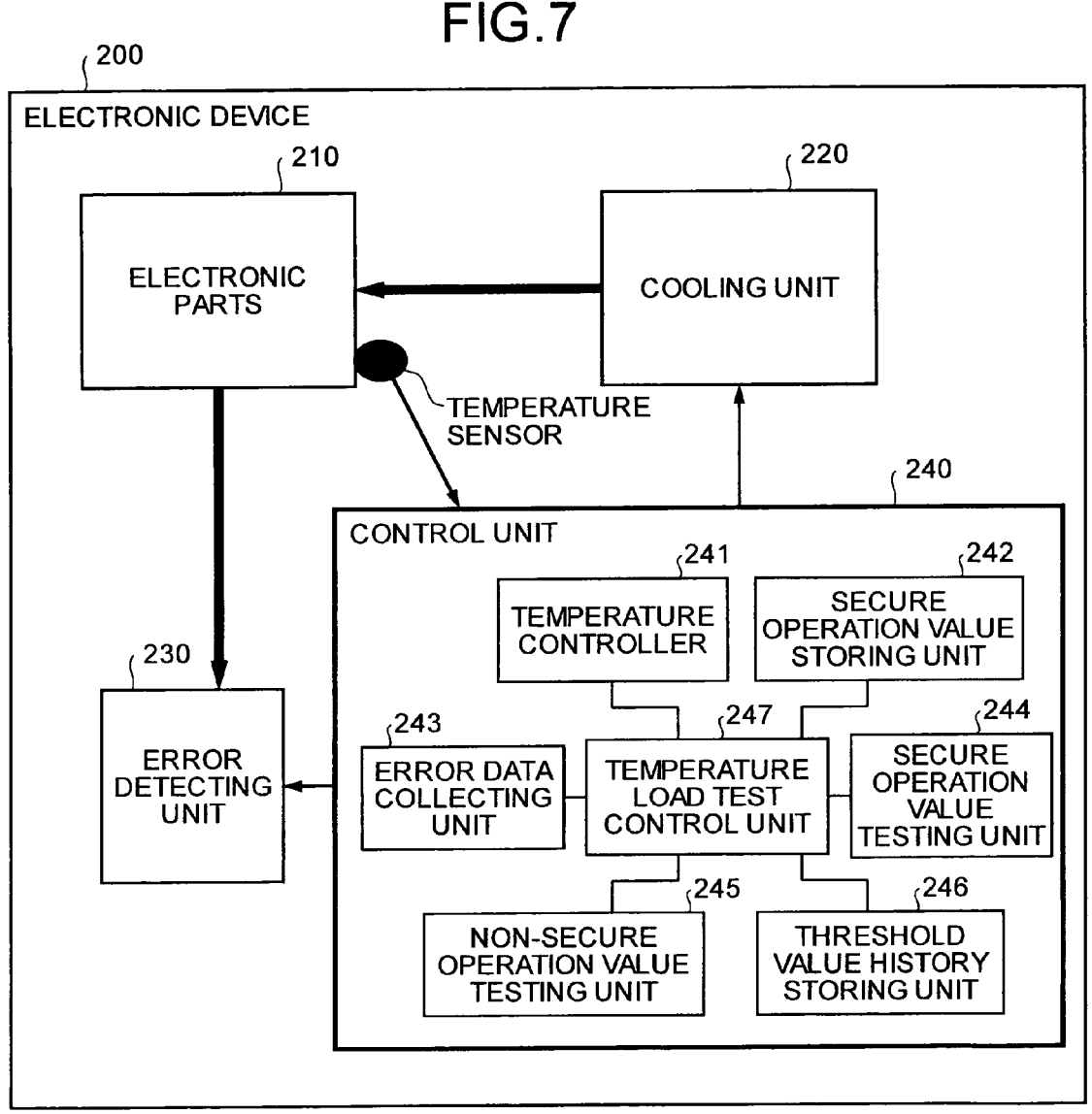
FIG. 7 is a block diagram of an electronic device according to a second embodiment of the present invention.

FIG. 7 is a block diagram of an electronic device according to a second embodiment of the present invention. An electronic device 200 includes an electronic part 210, a cooling unit 220, an error detecting unit 230, and a control unit 240.

The electronic part 210 is a part that realizes the device functions, and for which failure prediction is to be carried out. The cooling unit 220 is functional part that cools the electronic part 210. The error detecting unit 230 is a functional part that detects malfunctioning in the electronic part 210.

The control unit 240 applies a temperature load on the electronic part 210 by controlling the cooling unit 220 and carries out failure prediction for the electronic part 210 based on the error detected by the error detecting unit 230.

The control unit 240 includes a temperature controller 241, a secure operation value storing unit 242, an error data collecting unit 243, a secure operation value testing unit 244, a non-secure operation value testing unit 245, a threshold value history storing unit 246, and a temperature load test controller 247. The temperature controller 241 sets the temperature of the electronic part 210 to a predetermined value by controlling the cooling unit 220. The secure operation value storing unit 242 stores secure operation temperature values of the hard disk 210. The error data collecting unit 243 calculates error data of the hard disk 210 based on the error detected by the error detecting unit 230. The secure operation value testing unit 244 carries out a secure temperature value application test. The non-secure operation value testing unit 245 carries out a non-secure temperature value application test. The threshold value history storing unit 246 stores a history of threshold temperature values determined by the non-secure operation value testing unit 245. The temperature load test controller 247 controls all the temperature load tests.

Thus, in the second embodiment of the present invention, the temperature of the electronic part 210 is set to a predetermined value by controlling the cooling unit by means of the temperature controller 241. Consequently, temperature load tests can be carried out without external application of heat on the electronic part 210.

In the second embodiment explained above, temperature load is applied on an electronic part by controlling a cooling unit. However, if the heat generation is not enough for conducting the temperature load test, heat load can be applied by increasing the processing load of the electronic part. In the electronic device explained in a third embodiment of the present invention, the temperature load tests are carried out by applying temperature load by increasing the processing load of the electronic part.

Figure 8:
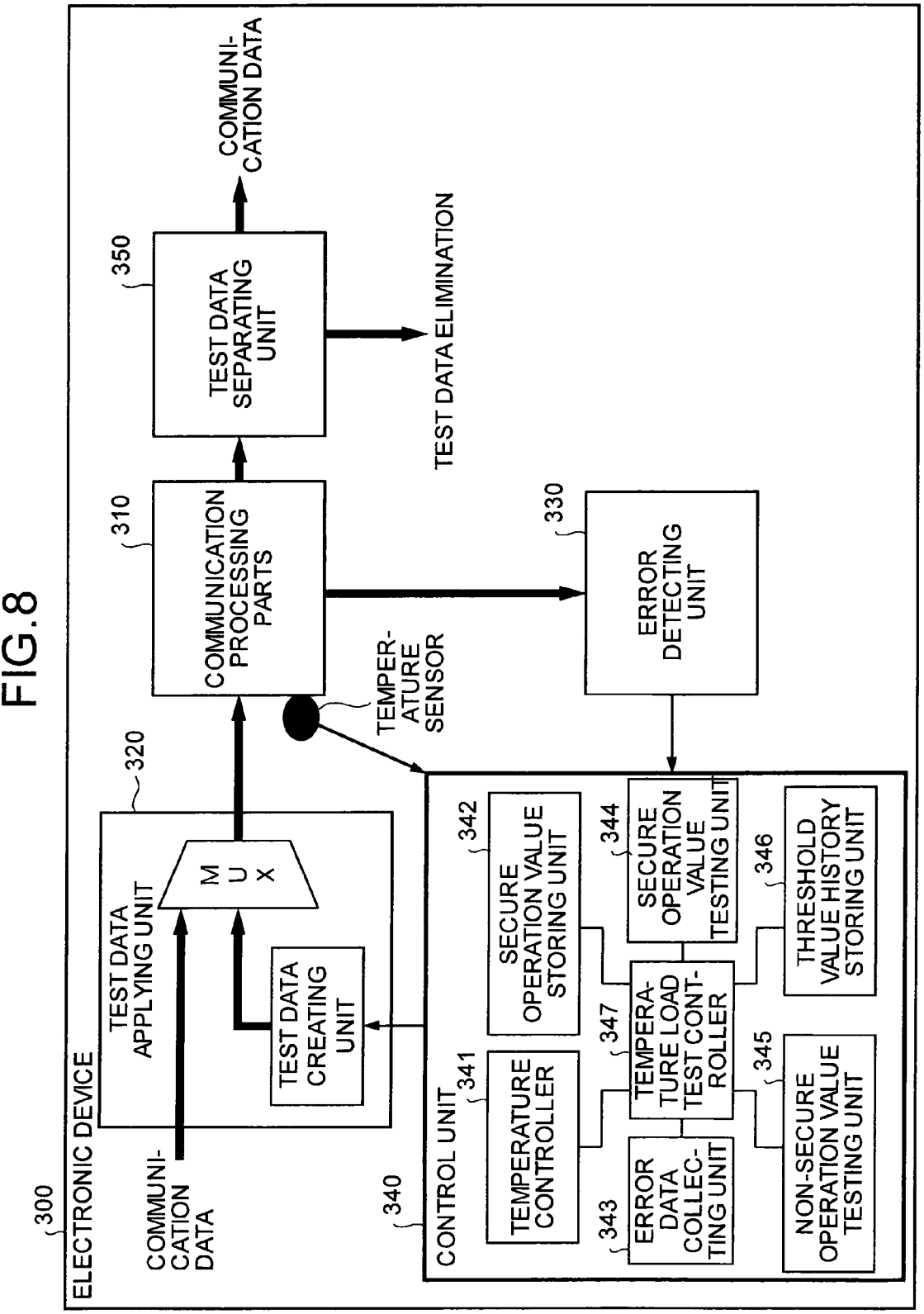
FIG. 8 is a block diagram of an electronic device according to a third embodiment of the present invention.

FIG. 8 is a block diagram of an electronic device according to a third embodiment of the present invention. An electronic device 300 includes a communication processing part 310, a test data applying unit 320, and error detecting unit 330, a control unit 340, and a test data separating unit 350.

The communication processing part 310 is a part that carries out communication processing, and for which failure prediction is to be carried out. The test data applying unit 320 is a processing unit that adds test data to regular data in order to increase the processing load of the communication processing part 310. The error detecting unit 330 is a functional unit that detects error generated in the communication processing part 310.

The control unit 340 includes a temperature controller 341, a secure operation value storing unit 342, error data collecting unit 343, secure operation value testing unit 344, a non-secure operation value testing unit 345, a threshold value history storing unit 346, and a temperature load test controller 347. The temperature controller 341 sets the temperature of the communication processing part 210 to a predetermined value by controlling the test data applying unit 320. The secure operation value storing unit 342 stores secure operation temperature values of the communication processing parts.

The error data collecting unit 343 calculates error data based on the error detected by the error detecting unit 330. The secure operation value testing unit 344 carries out a secure operation temperature value application test. The non-secure operation value testing unit 345 carries out a non-secure operation temperature value application test. The threshold value history storing unit 346 stores threshold temperature values determined by the non-secure operation value testing unit 345. The temperature load test controller 347 controls all the temperature load tests.

The test data separating unit 350 retrieves communication data by separating the test data that is added to the communication data by the test data applying unit in order to increase the processing load of the communication processing part 310.

Thus, in the third embodiment of the present invention, the temperature of the communication processing part 310 is set to a predetermined value by controlling the test data applying unit to adjust the processing load of the communication processing part 310. Consequently, temperature load tests can be carried out without external application of heat on the communication processing part 310.

In the first embodiment to the third embodiment, failure prediction is carried out by applying a temperature load on an electronic part. It is also possible to carry out failure prediction by applying environmental loads to an electronic part other than temperature load.

For instance, voltage is one of the operating conditions of an electronic part. A maximum voltage and a minimum voltage for absolute rating, and a maximum voltage and a minimum voltage for secure operation are stipulated as operating conditions for all electronic parts. In a blade server according to a fourth embodiment of the present invention, the voltage applied on an electronic part is varied and failure prediction is carried out for the electronic part under a high voltage condition or a low voltage condition.

Figure 9:
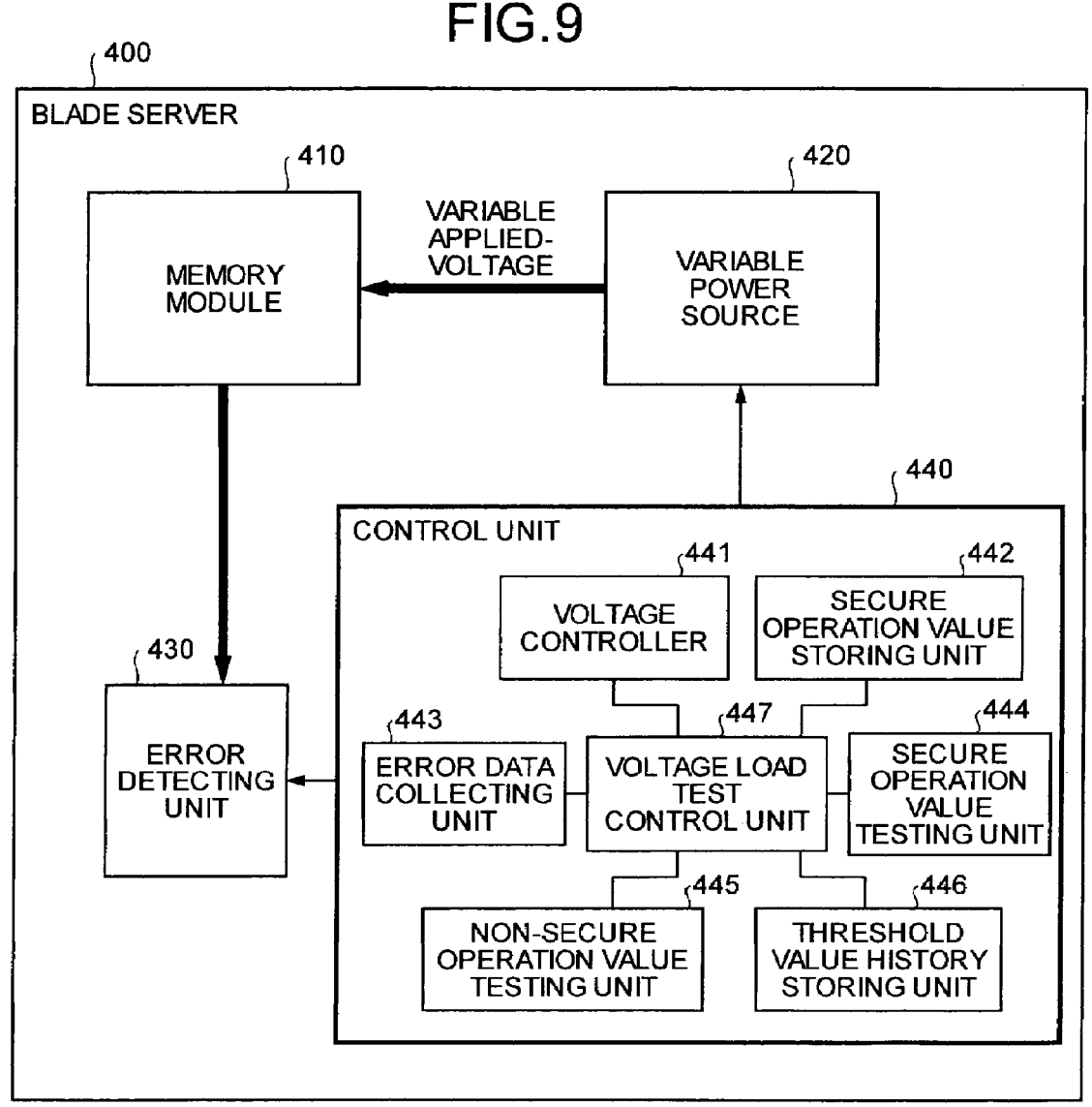
FIG. 9 is a block diagram of a blade server according to a fourth embodiment of the present invention.

FIG. 9 is a block diagram of a blade server according to a fourth embodiment of the present invention. A blade server 400 includes a memory module 410, a variable power source 420, an error detecting unit 430, and a control unit 440.

The memory module 410 is a part for which failure prediction is to be carried out. The memory module 410 has an error-correcting function which uses error-correcting code (ECC). In ECC error correction, one-bit error is automatically corrected by the ECC and the result is reported to the blade server 400. However, when a two-bit error occurs, it fails to be corrected and is reported as a memory access error.

Figure 10:
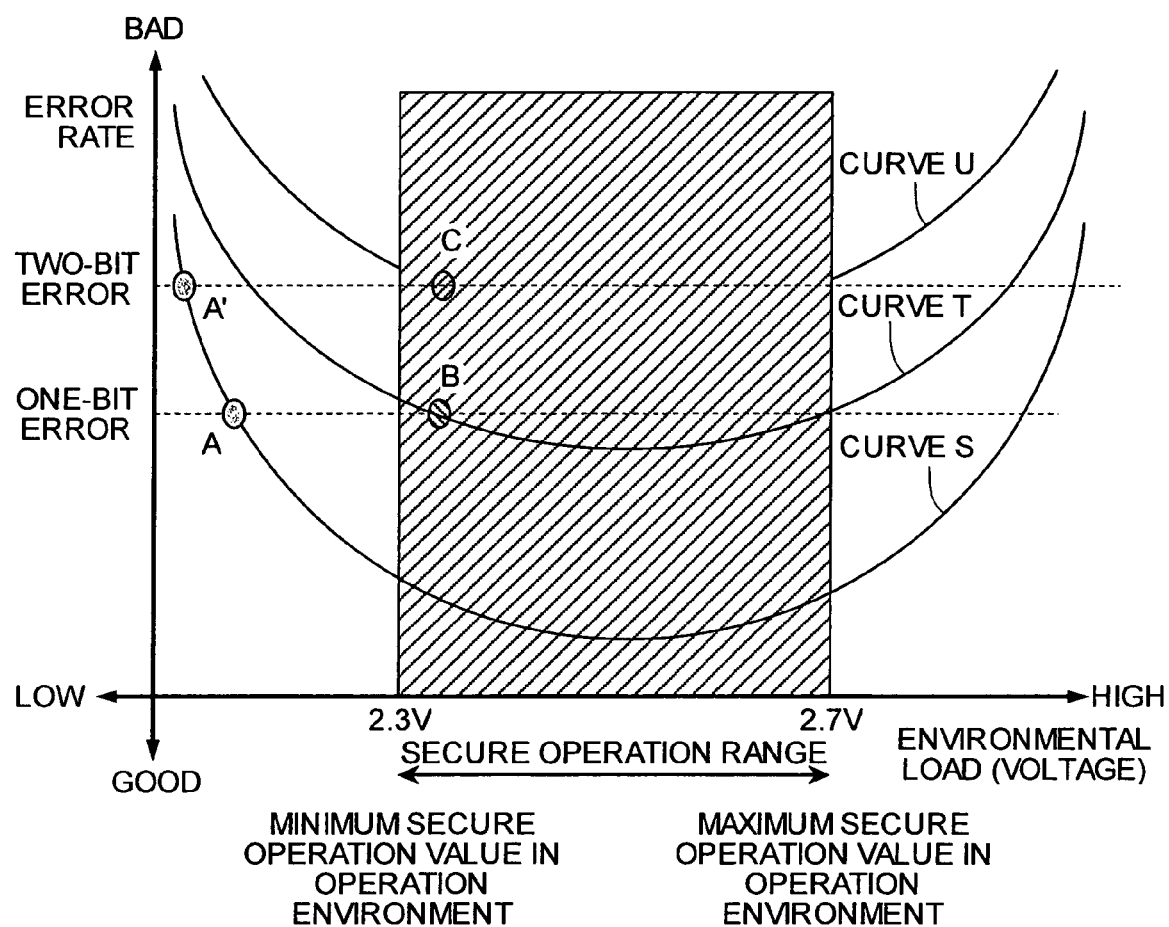
FIG. 10 is a graph of an error ratio of a memory module in response to an applied voltage.

FIG. 10 is a graph of an error ratio of a memory module 410 in response to an applied voltage. If the memory module 410 is operated within the secure operation value range error is unlikely to occur. However, when the characteristics of the device deteriorate with age, the frequency of occurrence of memory errors increases.

The curve S shown in FIG. 10 represents a characteristic curve during normal operation. Neither one bit nor two-bit error occurs within secure operation value range. If the characteristics deteriorate with the progression of aged deterioration, the characteristic curve resembles the curve T. Under such circumstances, even within secure operation value range, two-bit error does not occur; only one-bit error (point B) occurs. Therefore, there is no failure as such of the blade server 400.

However, the characteristic curve resembles curve U if the deterioration continues further, two-bit error (point C) occurs. Therefore, if the time of failure can be predicted before the deterioration progresses further, it can be prevented.

In other words, the time of failure can be predicted, by the procedure explained by the flow chart shown in FIG. 6, by calculating the time of progress from point A to point B, or from point A' to point C of FIG. 10.

The variable power source 420 applies voltage load on the memory module 410 by varying the voltage. The error detecting unit 430 detects the error that occurs in the memory module 410.

The control unit 440 controls the variable power source 420 to apply varying voltage on the memory module 410 and carries out failure prediction. The control unit 440 includes a voltage controller 441, a secure operation value storing unit 442, an error data collecting unit 443, a secure operation value testing unit 444, a non-secure operation value testing unit 445, a threshold value history storing unit 446, and a voltage load test controller 447. The voltage controller 441 controls the variable power source 420. The secure operation value storing unit 442 stores secure operation voltage values of the memory module 410. The error data collecting unit 443 calculates an error rate of the memory module 410 based on the error detected by the error detecting unit 430. The secure operation value testing unit 444 carries out a secure operation voltage value application test. The non-secure operation value testing unit 445 carries out a non-secure operation voltage value application test. The threshold value history storing unit 446 stores a history of threshold voltage values determined by the non-secure operation value testing unit 445. The voltage load test controller 447 controls all the voltage load tests.

Thus, in the fourth embodiment of the present invention, precise failure prediction is achieved as it is based on application of a voltage load on the memory module 410 by the variable power source 420 controlled by the control unit 440, and detection of error under the voltage load in the memory module 410 by the error detecting unit 430.

A voltage load is applied on a memory module in the fourth embodiment. However, a voltage load may be applied on a CPU to carry out failure prediction for the CPU.

Figure 11:
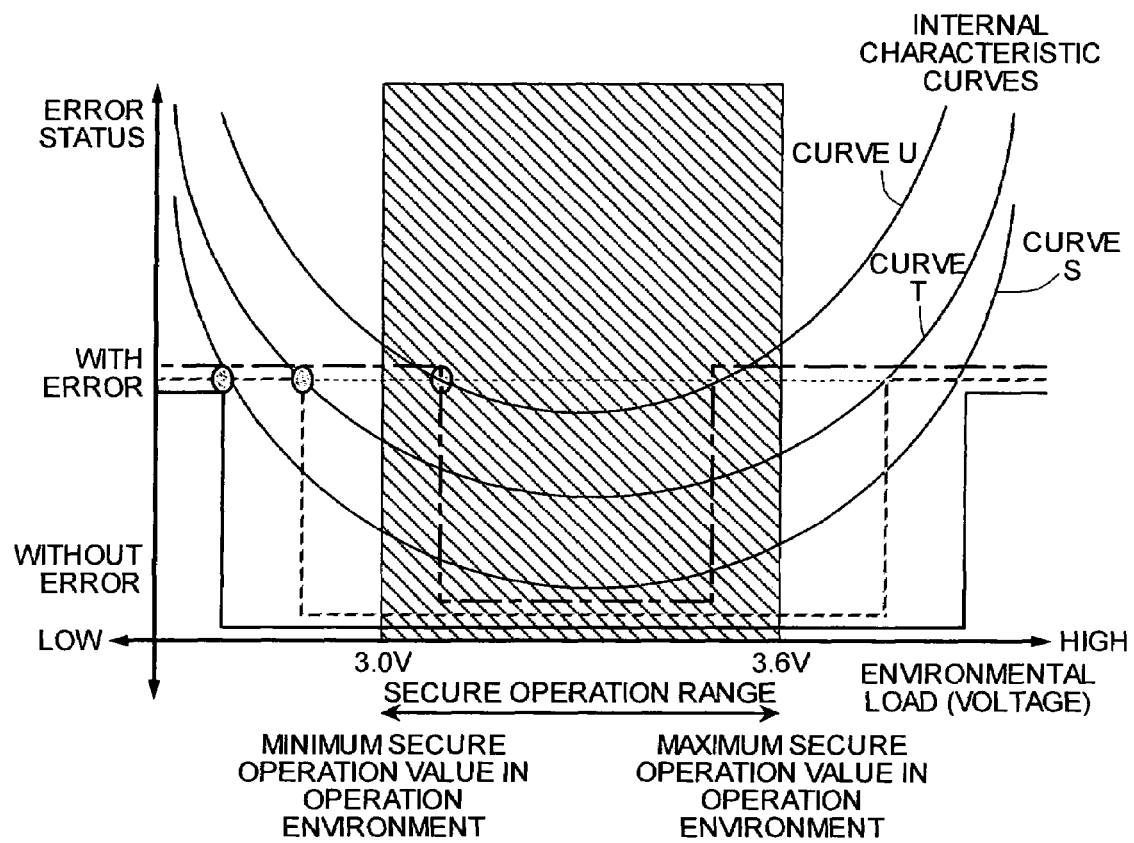
FIG. 11 is a graph of an error status in a CPU in response to an applied voltage.

FIG. 11 is a graph of an error status in a CPU in response to an applied voltage. The CPU outputs an alarm signal when an error occurs in its internal functioning. This alarm is output when a bus parity error or sequence error occurs inside the CPU and not when it functioning normally (curve S).

However, if the characteristics of the CPU deteriorate, the margin for setup hold becomes insufficient, and if there is a malfunctioning in the internal timing, malfunctioning related to bus parity error, sequence error occurs.

Thus, when the internal characteristics that change gradually due to aged deterioration exceed a threshold value, error is output (curve U) even in a digital circuit. Consequently, the failure time can be predicted by varying the voltage load at curve T, and measuring the value at which error occurs.

In the first embodiment to the fourth embodiment according to the present invention, failure prediction is carried out by applying an environmental load on an electronic part. Failure prediction can also be carried out by applying an environmental load on mechanical parts.

For instance, conditions are stipulated for mechanical parts that are driven by a motor, such as a fan, which has a stipulated maximum number of rotations and minimum number of rotations. Error detection in the mechanical part can be carried out from the detection of error related to increased or decreased number of rotations (that is, when the number of rotations is not the stipulated value and there is a fluctuation in the number of rotations).

Figure 12:
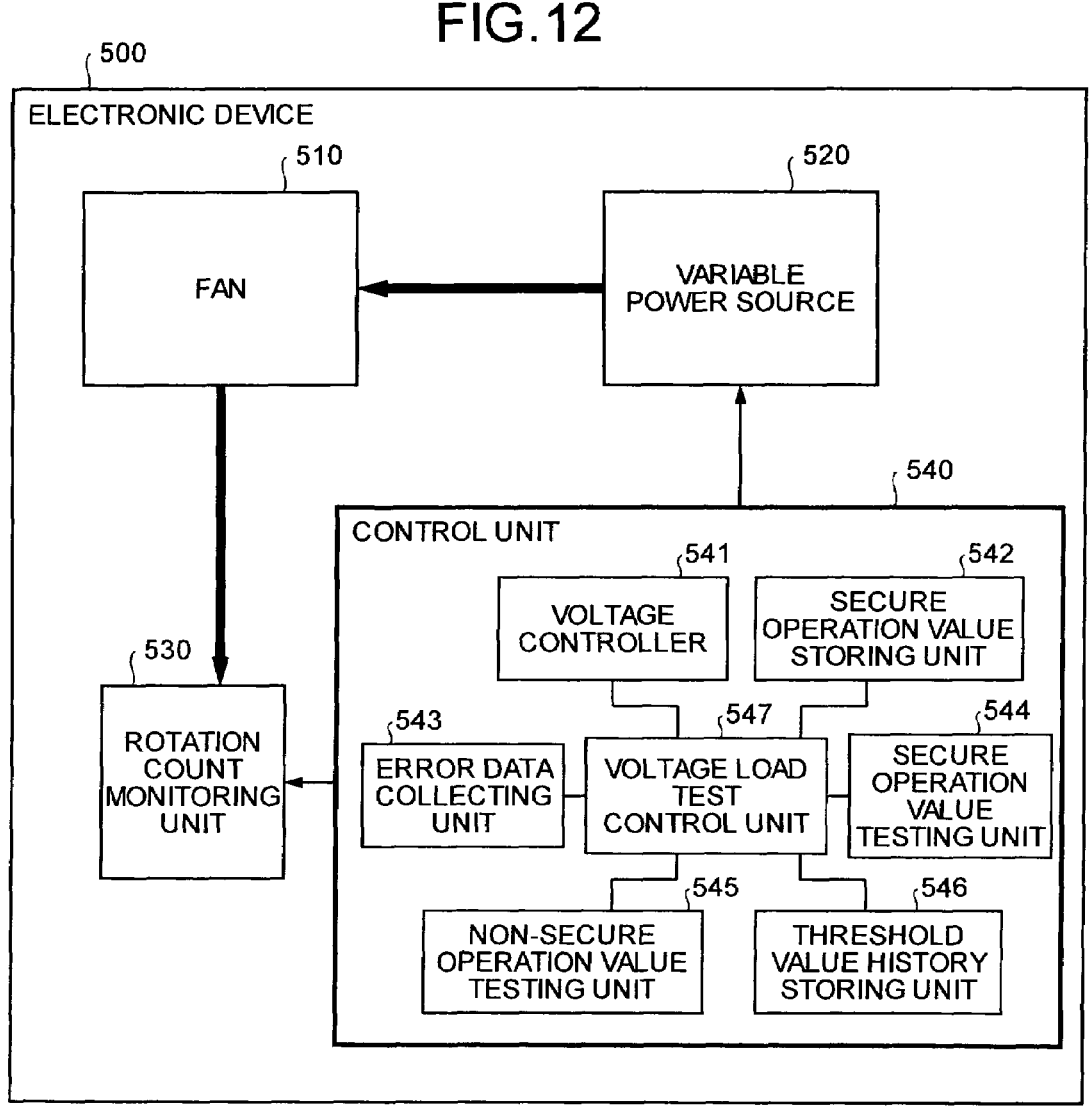
FIG. 12 is a block diagram of an electronic device according to a fifth embodiment of the present invention.

FIG. 12 is a block diagram of an electronic device according to a fifth embodiment of the present invention. An electronic device 500 includes a fan 510, a variable power source 520, a rotation count monitoring unit 530, and a control unit 540.

The fan 510 is a part for which failure prediction is to be carried out. The variable power source 520 is a power source that applies voltage of varying values on the fan 510. The rotation count monitoring unit 530 monitors the number of rotations of the fan 510 and detects the error.

The control unit 540 controls the variable power source 520 to vary the voltage value applied on the fan 510 and carries out failure prediction. The control unit 540 includes a voltage controller 540, secure operation value storing unit 542, an error data collecting unit 543, a secure operation value testing unit 544, a non-secure operation value testing unit 545, a threshold value history storing unit 546, and a voltage load test controller 547. The voltage controller 541 controls the variable power source 520. The secure operation value storing unit 542 stores secure operation voltage values of the fan 510. The error data collecting unit 543 calculates error data of the fan 510 based on an error in rotation count detected by the rotation count monitoring unit 530. The secure operation value testing unit 544 carries out a secure operation voltage value application test. The non-secure operation value testing unit 545 carries out a non-secure operation voltage value application test. The threshold value history storing unit 546 stores a history of threshold voltages determined by the non-secure operation value testing unit 545. The voltage load test controller 547 controls all the voltage load tests.

Thus, in the fifth embodiment of the present invention, precise failure prediction is achieved as it is based on application of a voltage load on the fan 510 by the variable power source 520 controlled by the control unit 540, and detection of error under the voltage load by the rotation count monitoring unit 530.

Failure prediction for a fan is carried out by applying a voltage load to it in the fifth embodiment of the present invention. However, failure prediction can be carried out for any motor-driven mechanical part or for a non-electronic device which includes a motor-driven mechanical part.

In a device that is a combination of mechanical and electronic parts, such as a hard disk drive, failure prediction can be carried out by increasing the access frequency of the hard disk or by increasing the load on the drive system, apart from failure prediction by application of environmental load such as temperature load, voltage load, etc.

Figure 13:
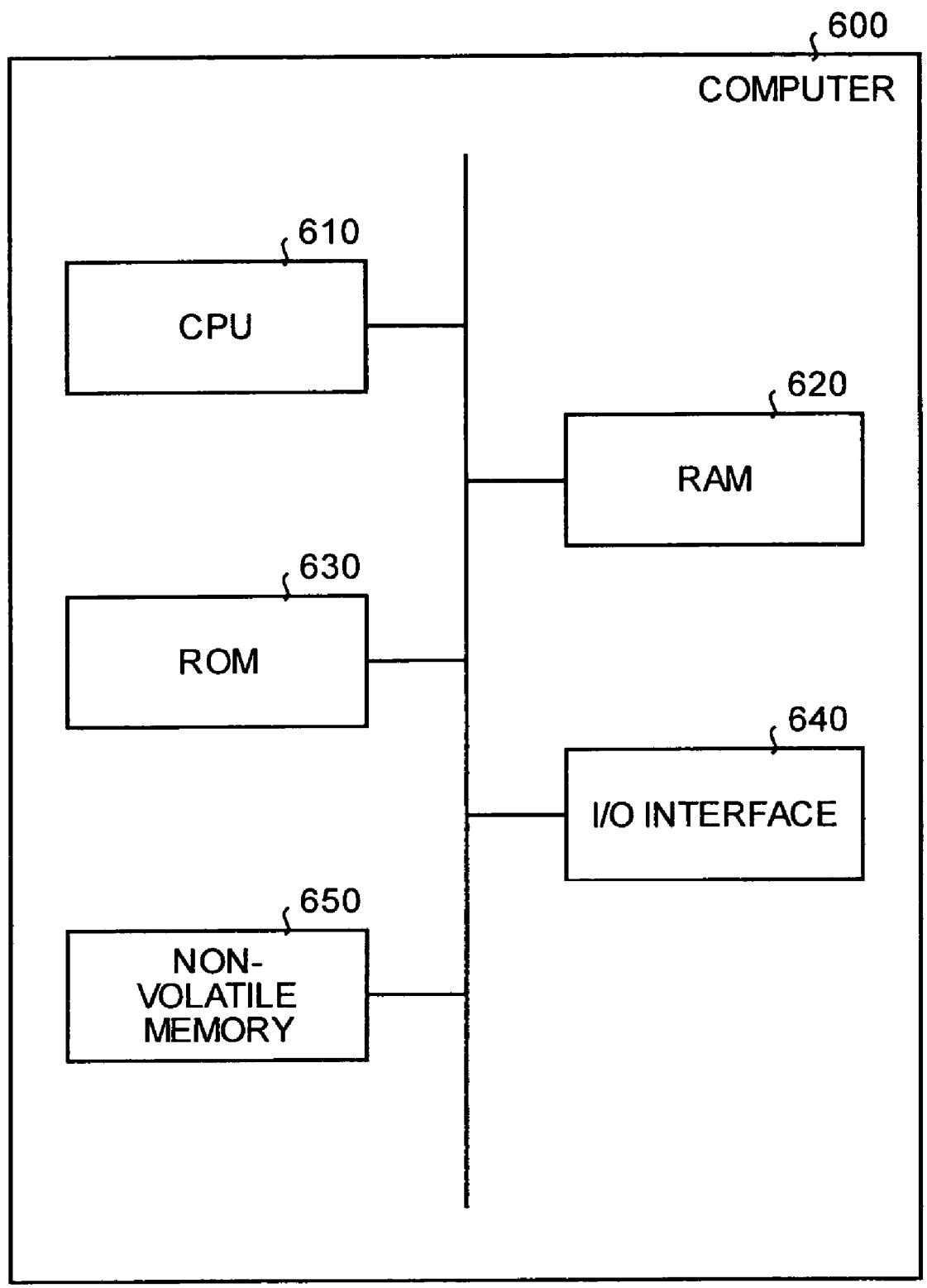
FIG. 13 is a schematic of a computer that executes a failure prediction program for the electronic devices according to the first embodiment to the fifth embodiment.

FIG. 13 is a schematic of a computer that executes a failure prediction program for the electronic devices according to the first embodiment to the fifth embodiment. A computer 600 includes a CPU 610, a random access memory (RAM) 620, a read-only memory (ROM) 630, and input/output (I/O) interface 640, and a non-volatile memory 650.

The CPU 610 is a processing device that executes the failure prediction program. The RAM 620 is a storage unit that stores intermediate results of the failure prediction program. The ROM 630 is a storage unit that stores the failure prediction program, secure operation values, etc. The I/O interface 640 is an interface for inputting values measured by a sensor, or for outputting settings to a temperature setting unit or a variable power source. The non-volatile memory 650 stores data that is stored in a threshold value history storing unit, etc.

The CPU 610, RAM 620, ROM 630, non-volatile memory 650, etc. may be used as constituent parts of an electronic device as well as exclusively for executing the failure prediction program.

According to the present invention, direct detection of an impending part failure is carried out. Consequently, a highly reliable failure prediction can be achieved.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An electronic device that includes a part prone to aged deterioration, comprising:
    an environmental load applying unit that applies a first environmental load of a boundary secure operation value between a secure operation environment and non-secure operation environment of the electronic device or a second environmental load of a value that is close to the boundary secure operation value within a range of a secure operation of the electronic device to the part;
    an error detecting unit that detects an error in the part with the first or second environmental load applied; and
    a failure predicting unit that predicts a failure of the part based on the error detected.

2. The electronic device according to claim 1, wherein the failure predicting unit predicts the failure if an error rate of the error detected is greater than a predetermined value.

3. The electronic device according to claim 1, wherein the environmental load applying unit applies a temperature load to the part as the environmental load.

4. The electronic device according to claim 3, wherein the environmental load applying unit further includes
    a temperature setting unit that applies the temperature load on the part; and
    a temperature controller that controls a temperature of the part using the temperature setting unit.

5. The electronic device according to claim 3, wherein the environmental load applying unit further includes
    a cooling unit that cools down the part; and
    a temperature controller that controls a temperature of the part using the cooling unit.

6. The electronic device according to claim 3, wherein the part is a communication processing part that processes communication data, and
the environmental load applying unit applies the environmental load on the communication processing part by adding other data to the communication data.

7. The electronic device according to claim 1, wherein the environmental load applying unit applies the environmental load by varying an applied voltage to the part.

8. The electronic device according to claim 7, wherein the part is a fan, and
the error detecting unit detects the error by monitoring a rotation count of the fan.

9. The electronic device according to claim 1, wherein the part is a hard disk, and
the environmental load applying unit applies the environmental load on the disk by increasing an access frequency of the hard disk.

10. An electronic device that includes a part prone to aged deterioration, comprising:
an environmental load applying unit that applies an environmental load of a non-secure operation value that exceeds the boundary secure operation value to the part;
an error detecting unit that detects an error in the part with the environmental load applied; and
a failure predicting unit that predicts a failure of the part based on a value of the environmental load with which an error rate of the error detected becomes a failure threshold value;
wherein the failure predicting unit includes a threshold value history storing unit that stores a last value of the environmental load with which an error rate became the failure threshold value when the environmental load of a non-secure operation value was applied as a previous measured threshold value, and
the failure predicting unit predicts the failure if a first absolute value of a difference between the previous measured threshold value and a current measured threshold value that is a current value of the environmental load with which an error rate became the failure threshold value when the environmental load of a non-secure operation value was applied is greater than a second absolute value of a difference between the current measured threshold value and a secure operation value.

11. A method of predicting a failure of a part prone to aged deterioration, comprising:
applying a first environmental load of a boundary secure operation value between a secure operation environment and non-secure operation environment of the electronic device or a second environmental load of a value that is close to the boundary secure operation value within a range of a secure operation of the electronic device to the part;
detecting an error in the part with the first or second environmental load applied;
predicting the failure of the part based on the error detected; and
notifying the user high possibility of the failure of the part when the failure is predicted.

12. A computer readable recording medium for storing a computer program that makes a computer execute:
applying a first environmental load of a boundary secure operation value between a secure operation environment and non-secure operation environment of the electronic device or a second environmental load of a value that is close to the boundary secure operation value within a range of a secure operation of the electronic device to the part;
detecting an error in the part with the first or second environmental load applied;
predicting the failure of the part based on the error detected; and
notifying the user high possibility of the failure of the part when the failure is predicted.

* * * * *